US010394528B2

(12) United States Patent
Zhou et al.

(10) Patent No.: US 10,394,528 B2
(45) Date of Patent: Aug. 27, 2019

(54) RETURNING A RUNTIME TYPE LOADED FROM AN ARCHIVE IN A MODULE SYSTEM

(71) Applicant: Oracle International Corporation, Redwood Shores, CA (US)

(72) Inventors: Jiangli Zhou, San Ramon, CA (US); Ioi Kim Lam, Mountain View, CA (US); Calvin C. Cheung, Cupertina, CA (US); Karen Margaret Pearson Kinnear, Boxborough, MA (US)

(73) Assignee: Oracle International Corporation, Redwood Shores, CA (US)

( * ) Notice: Subject to any disclaimer, the term of this patent is extended or adjusted under 35 U.S.C. 154(b) by 453 days.

(21) Appl. No.: 15/085,637

(22) Filed: Mar. 30, 2016

(65) Prior Publication Data

US 2017/0286065 A1 Oct. 5, 2017

(51) Int. Cl.
*G06F 8/20* (2018.01)
*G06F 9/448* (2018.01)
*G06F 9/445* (2018.01)
*G06F 9/455* (2018.01)

(52) U.S. Cl.
CPC ............... *G06F 8/24* (2013.01); *G06F 9/449* (2018.02); *G06F 9/44521* (2013.01); *G06F 9/45504* (2013.01); *G06F 9/44563* (2013.01)

(58) Field of Classification Search
CPC . G06F 8/24; G06F 9/449; G06F 9/443; G06F 9/44521; G06F 9/45504; G06F 9/44563
See application file for complete search history.

(56) References Cited

U.S. PATENT DOCUMENTS

| 5,815,718 | A | 9/1998 | Tock |
| 5,966,542 | A | 10/1999 | Tock |
| 6,223,346 | B1 | 4/2001 | Tock |
| 6,470,494 | B1 | 10/2002 | Chan et al. |
| 6,571,388 | B1 | 5/2003 | Venkatraman et al. |
| 6,658,492 | B1 | 12/2003 | Kawahara et al. |
| 6,745,386 | B1 | 6/2004 | Yellin |
| 6,813,762 | B1 | 11/2004 | Plaxton |
| 6,826,559 | B1 | 11/2004 | Ponte |
| 6,883,163 | B1 | 4/2005 | Schwabe |

(Continued)

OTHER PUBLICATIONS

Oracle, "Class Data Sharing", Accessed at https://docs.oracle.com/javase/1.5.0/docs/guide/vm/dass-data-sharing.html, 2015, 2 pages.

(Continued)

*Primary Examiner* — Viva Miller
(74) *Attorney, Agent, or Firm* — Invoke

(57) ABSTRACT

Returning a runtime type loaded from an archive in a module system is disclosed. Operations include (a) identifying, by a class loader implemented in a runtime environment, an archived runtime type loaded into an archive from a module source; (b) identifying a particular package associated with the archived runtime type; (c) determining that the particular package is defined to a runtime module that is defined to (i) the class loader or (ii) any class loader in the class loader hierarchy to which the class loader delegates; and (d) returning directly or indirectly, by the class loader, a runtime type loaded based on the archived runtime type from the archive.

20 Claims, 10 Drawing Sheets

(56) References Cited

U.S. PATENT DOCUMENTS

| | | |
|---|---|---|
| 6,951,022 B1 | 9/2005 | Golde et al. |
| 6,959,320 B2 | 10/2005 | Shah et al. |
| 6,981,245 B1 | 12/2005 | Schwabe |
| 6,983,460 B1 | 1/2006 | Goire et al. |
| 6,986,132 B1 | 1/2006 | Schwabe |
| 6,996,813 B1 | 2/2006 | Sokolov et al. |
| 7,032,216 B1 | 4/2006 | Nizhegorodov |
| 7,051,323 B2 | 5/2006 | Lam et al. |
| 7,228,532 B1 | 6/2007 | Shaylor et al. |
| 7,234,137 B2 | 6/2007 | Taylor et al. |
| 7,243,346 B1 | 7/2007 | Seth et al. |
| 7,318,229 B1 | 1/2008 | Connor et al. |
| 7,360,206 B1 | 4/2008 | Hatcher |
| 7,406,687 B1 | 7/2008 | Daynes et al. |
| 7,426,720 B1 | 9/2008 | Fresko |
| 7,434,202 B2 | 10/2008 | Kramer |
| 7,454,743 B2 | 11/2008 | Fuchs |
| 7,467,137 B1 | 12/2008 | Wolfe |
| 7,487,507 B1 | 2/2009 | Lun et al. |
| 7,490,320 B2 | 2/2009 | Kielstra et al. |
| 7,503,031 B2 | 3/2009 | Chang et al. |
| 7,512,664 B1 | 3/2009 | Brewer |
| 7,565,364 B1 | 7/2009 | Darcy et al. |
| 7,590,863 B2 | 9/2009 | Lambert |
| 7,644,402 B1 | 1/2010 | Daynes et al. |
| 7,752,599 B2 | 7/2010 | Takacsi-Nagy et al. |
| 7,784,043 B2 | 8/2010 | Atsatt |
| 7,895,445 B1 | 2/2011 | Albanese et al. |
| 7,941,402 B2 | 5/2011 | Smits |
| 7,966,602 B1 | 6/2011 | Webster et al. |
| 8,082,542 B2 | 12/2011 | Bottomley et al. |
| 8,127,284 B2 | 2/2012 | Meijer et al. |
| 8,250,559 B2 | 8/2012 | Daynes et al. |
| 8,307,352 B2 | 11/2012 | Mausolf et al. |
| 8,473,938 B1 | 6/2013 | Feeser |
| 8,489,872 B1 | 7/2013 | Kapoor |
| 8,495,611 B2 | 7/2013 | McCarthy et al. |
| 8,527,979 B2 | 9/2013 | Wookey |
| 8,533,704 B2 | 9/2013 | Wookey |
| 8,549,514 B2 | 10/2013 | Carteri et al. |
| 8,626,806 B2 | 1/2014 | Larimore et al. |
| 8,627,281 B2 | 1/2014 | Tatsubori |
| 8,706,881 B2 | 4/2014 | Ramu et al. |
| 8,738,589 B2 | 5/2014 | Stark et al. |
| 8,910,138 B2 | 12/2014 | Kuppala et al. |
| 8,959,106 B2 | 2/2015 | De et al. |
| 8,966,464 B1 | 2/2015 | Christopher et al. |
| 9,069,582 B2 | 6/2015 | Mausolf et al. |
| 9,098,715 B1 | 8/2015 | Spear et al. |
| 9,128,789 B1 | 9/2015 | Zorzella et al. |
| 9,292,315 B1 | 3/2016 | Dawson et al. |
| 9,323,501 B1 | 4/2016 | Ielceanu et al. |
| 9,336,018 B2 | 5/2016 | Zhou et al. |
| 9,361,070 B1 | 6/2016 | Nuss |
| 9,489,214 B2 | 11/2016 | Cobb |
| 9,656,171 B2 | 5/2017 | Itsuno |
| 2001/0047513 A1 | 11/2001 | Tock |
| 2002/0120717 A1 | 8/2002 | Giotta |
| 2002/0138667 A1 | 9/2002 | Sokolov et al. |
| 2003/0009747 A1 | 1/2003 | Duran |
| 2003/0041167 A1 | 2/2003 | French et al. |
| 2003/0041238 A1 | 2/2003 | French et al. |
| 2003/0070161 A1 | 4/2003 | Wong et al. |
| 2003/0101381 A1 | 5/2003 | Mateev et al. |
| 2003/0191864 A1 | 10/2003 | Govindarajapuram et al. |
| 2004/0003079 A1 | 1/2004 | Aiu et al. |
| 2004/0015935 A1 | 1/2004 | Sokolov et al. |
| 2004/0153996 A1 | 8/2004 | Boykin et al. |
| 2004/0181471 A1 | 9/2004 | Rogers |
| 2004/0237064 A1* | 11/2004 | Liu .................. G06F 9/50 |
| | | 717/101 |
| 2004/0261069 A1 | 12/2004 | Verbeke et al. |
| 2005/0050528 A1 | 3/2005 | Wang |
| 2005/0055681 A1 | 3/2005 | Gadre |
| 2005/0055682 A1 | 3/2005 | Gadre et al. |
| 2005/0193137 A1 | 9/2005 | Farnham |
| 2005/0198624 A1 | 9/2005 | Chipman |
| 2005/0216885 A1 | 9/2005 | Ireland |
| 2005/0246695 A1 | 11/2005 | Wang |
| 2006/0026126 A1 | 2/2006 | Cabillic |
| 2006/0041880 A1 | 2/2006 | Martin et al. |
| 2006/0074989 A1 | 4/2006 | Laborczfalvi et al. |
| 2006/0101092 A1 | 5/2006 | Ishida et al. |
| 2006/0136401 A1 | 6/2006 | Normington |
| 2006/0190935 A1 | 8/2006 | Kielstra et al. |
| 2006/0225059 A1 | 10/2006 | Plaxton et al. |
| 2006/0265760 A1 | 11/2006 | Daemke et al. |
| 2006/0288353 A1 | 12/2006 | King et al. |
| 2007/0006141 A1 | 1/2007 | Bracha et al. |
| 2007/0011451 A1 | 1/2007 | Botzum et al. |
| 2007/0011723 A1 | 1/2007 | Chao |
| 2007/0027907 A1 | 2/2007 | Kulkarni et al. |
| 2007/0061456 A1 | 3/2007 | Waris |
| 2007/0192380 A1 | 8/2007 | Tabellion et al. |
| 2007/0192830 A1 | 8/2007 | O'Connor |
| 2007/0255751 A1 | 11/2007 | Bansal et al. |
| 2007/0288280 A1 | 12/2007 | Gilbert et al. |
| 2008/0010649 A1 | 1/2008 | Grimaud et al. |
| 2008/0022260 A1 | 1/2008 | Kinder et al. |
| 2008/0066089 A1 | 3/2008 | Kamiya et al. |
| 2008/0091792 A1 | 4/2008 | Mei et al. |
| 2008/0127070 A1 | 5/2008 | Barcia et al. |
| 2008/0127141 A1 | 5/2008 | Fulton |
| 2008/0134154 A1 | 6/2008 | Patel et al. |
| 2008/0134207 A1 | 6/2008 | Chamieh et al. |
| 2008/0172656 A1 | 7/2008 | Russell et al. |
| 2008/0172658 A1 | 7/2008 | Russell et al. |
| 2008/0276231 A1 | 11/2008 | Huang et al. |
| 2008/0282266 A1 | 11/2008 | Kabanov |
| 2009/0070792 A1 | 3/2009 | Cable |
| 2009/0100404 A1 | 4/2009 | Chaturvedi et al. |
| 2009/0106747 A1 | 4/2009 | Arcese |
| 2009/0113406 A1 | 4/2009 | Bandaram et al. |
| 2009/0133001 A1 | 5/2009 | Rozenfeld |
| 2009/0150864 A1 | 6/2009 | Meijer et al. |
| 2009/0164760 A1 | 6/2009 | Sterbenz |
| 2009/0249311 A1 | 10/2009 | Dandamudi et al. |
| 2009/0319554 A1 | 12/2009 | Krishnaswamy et al. |
| 2010/0023702 A1 | 1/2010 | Landau et al. |
| 2010/0083004 A1 | 4/2010 | Kirshenbaum |
| 2010/0138820 A1 | 6/2010 | Joshi |
| 2010/0199259 A1 | 8/2010 | Quinn et al. |
| 2011/0029960 A1 | 2/2011 | Cimadamore et al. |
| 2011/0131561 A1 | 6/2011 | Adams et al. |
| 2011/0145278 A1 | 6/2011 | Maes |
| 2011/0197183 A1 | 8/2011 | Wang |
| 2011/0239184 A1 | 9/2011 | Feigen |
| 2011/0271251 A1 | 11/2011 | Buckley et al. |
| 2011/0271254 A1 | 11/2011 | Reinhold et al. |
| 2011/0283256 A1 | 11/2011 | Raundahl et al. |
| 2011/0296375 A1 | 12/2011 | Mooney |
| 2011/0302565 A1 | 12/2011 | Ferris et al. |
| 2011/0321019 A1 | 12/2011 | Gibbons et al. |
| 2012/0005660 A1 | 1/2012 | Goetz et al. |
| 2012/0005663 A1 | 1/2012 | Burckart et al. |
| 2012/0036462 A1 | 2/2012 | Schwartz et al. |
| 2012/0096433 A1 | 4/2012 | Reinhold et al. |
| 2012/0117538 A1 | 5/2012 | Buckley |
| 2012/0151505 A1 | 6/2012 | Verissimo De Oliveira |
| 2012/0159466 A1 | 6/2012 | Burckart et al. |
| 2012/0191922 A1 | 7/2012 | Monnie et al. |
| 2012/0210308 A1 | 8/2012 | Goetz et al. |
| 2012/0210320 A1 | 8/2012 | Goetz et al. |
| 2012/0272214 A1 | 10/2012 | Goetz et al. |
| 2012/0278797 A1 | 11/2012 | Secrist et al. |
| 2012/0311531 A1 | 12/2012 | Lebert |
| 2012/0317589 A1 | 12/2012 | Foti |
| 2012/0331445 A1 | 12/2012 | Centonze et al. |
| 2013/0007706 A1 | 1/2013 | Burckart et al. |
| 2013/0007713 A1 | 1/2013 | Arcese et al. |
| 2013/0125202 A1 | 5/2013 | Sprague et al. |
| 2013/0232469 A1 | 9/2013 | Agarwal |
| 2013/0339926 A1 | 12/2013 | Raundahl et al. |
| 2014/0089907 A1 | 3/2014 | Cabillic et al. |

(56) References Cited

U.S. PATENT DOCUMENTS

| | | |
|---|---|---|
| 2014/0130020 A1 | 5/2014 | Boshernitsan et al. |
| 2014/0137075 A1 | 5/2014 | Said et al. |
| 2014/0173574 A1 | 6/2014 | Schmidt et al. |
| 2014/0189672 A1 | 7/2014 | Raundahl et al. |
| 2014/0237176 A1 | 8/2014 | Takefman et al. |
| 2014/0245275 A1 | 8/2014 | Elias et al. |
| 2014/0282441 A1 | 9/2014 | Hoban et al. |
| 2014/0351802 A1 | 11/2014 | Elias et al. |
| 2014/0358972 A1 | 12/2014 | Guarrieri et al. |
| 2015/0026703 A1 | 1/2015 | Foti |
| 2015/0089478 A1 | 3/2015 | Cheluvaraju et al. |
| 2015/0113172 A1 | 4/2015 | Johnson et al. |
| 2015/0186129 A1 | 7/2015 | Apte et al. |
| 2015/0331681 A1 | 11/2015 | Rose et al. |
| 2015/0363174 A1 | 12/2015 | Rose et al. |
| 2015/0378752 A1 | 12/2015 | Stoodley |
| 2016/0011982 A1 | 1/2016 | Sandoz et al. |
| 2016/0011992 A1 | 1/2016 | Sandoz et al. |
| 2016/0055014 A1 | 2/2016 | Gallimore et al. |
| 2016/0055344 A1 | 2/2016 | Peterson et al. |
| 2016/0062878 A1 | 3/2016 | Westrelin et al. |
| 2016/0087933 A1 | 3/2016 | Johnson et al. |
| 2016/0098346 A1 | 4/2016 | Pechanec et al. |
| 2016/0148013 A1 | 5/2016 | Taldo et al. |
| 2016/0154658 A1 | 6/2016 | Stoodley |
| 2016/0210445 A1 | 7/2016 | Deaver |
| 2016/0232017 A1 | 8/2016 | Raundahl Gregersen |
| 2016/0344745 A1 | 11/2016 | Johnson et al. |
| 2016/0357586 A1 | 12/2016 | Rose |
| 2017/0024188 A1 | 1/2017 | Buckley et al. |
| 2017/0024196 A1 | 1/2017 | Buckley et al. |
| 2017/0039043 A1 | 2/2017 | Haupt et al. |
| 2017/0063874 A1 | 3/2017 | Buckley et al. |
| 2017/0068520 A1 | 3/2017 | Buckley et al. |
| 2017/0269929 A1 | 9/2017 | Hegarty et al. |
| 2017/0272316 A1 | 9/2017 | Johnson et al. |

OTHER PUBLICATIONS

IBM Knowledge Center,, "Class Data Sharing", IBM(Registered) SDK, Java (Trademark) Technology Edition, Version 7, Acccessed at https://www.ibm.eom/support/knowledgecenter/SSYKE2_7.0.0/com.ibm.java.lnx.70.doc/diag/understanding/shared_classes.html, 2016.

Bateman et al., "JEP 261: Module System", Accessed at http://openjdk.java.net/jeps/261, Oct. 23, 2014, 14 pages.

IBM Knowledge Center, "Class Data Sharing", IBM® SDK, Java™ Technology Edition, Version 7, Acccessed at https://www.ibm.com/support/knowledgecenter/SSYKE2_7.0.0/com.ibm.java.lnx.70.doc/diag/understanding/shared_classes.html, 2016.

Oracle, "Class Data Sharing", Accessed at https://docs.oracle.com/javase/1.5.0/docs/guide/vm/class-data-sharing.html, 2015, 2 pages.

Oracle, "Java™ Platform, Standard Edition 9, API Specification", Accessed at http://cr.openjdk.java.net/~mr/jigsaw/spec/api/, 2015, 10 pages.

Oracle, "Project Jigsaw", Accessed at http://openjdk.java.net/projects/jigsaw/, Mar. 24, 2016.

Reinhold , "JEP 220: Modular run-time images", OpenJDK, Accessed at http://openjdk.java.net/jeps/220, Oct. 23, 2014, 9 pages.

Reinhold, "The state of the module system", Accessed at http://openjdk.java.net/projects/jigsaw/spec/sotms/, Mar. 8, 2016, 27 pages.

Zaparanuks et al, "The Potential of Speculative Class-Loading", ACM, pp. 209-214, 2007.

Trance, Macphail, "Code Generation using Annotation Processors in the Java language—part 2: Annotation Processors", Available online at <https://deors.wordpress.com/2011/10/08/annotation-processors/>, Oct. 8, 2011, 14 pages.

Stock et al, "Metadata based Authoring for Technical Documentation", ACM, pp. 60-67, 2005.

Stack Overflow, "What's the difference between 'package' and 'module'" (last accessed on Dec. 6, 2016).

Schatzl et al, "Optimized Memory Management for Class Metadata in a JVM", ACM, pp. 151-160, 2011.

Rossberg et al., "Mixin Up the ML Module System", ACM Transactions on Programming Languages and Systems, vol. 35, No. 1, Article 2, Apr. 2013, pp. 2:1-2:84.

Reis et al., "A Module System for C++", Modules SG, Document No. N4047, May 27, 2014, pp. 1-22.

Qu et al., "Interoperable Metadata Semantics with Meta-Metadata: A Use Case Integrating Search Engines", ACM, pp. 171-174, 2011.

Oracle, "The Java (Trademark) Tutorials", Java Documentation, Available online at <https://docs.oracle.com/javase/tutorial/java/annotations/basics.html>, Copyright 1995, 2015, 2 pages.

Oracle, "Interface Iterable<T>", Java Platform Standard Ed. 8, Available online at <http://docs.oracle.eom/javase/8/docs/api/java/lang/Iterable.html>, Copyright 1993, 2016, 3 pages.

Oracle, "Getting Started with the Annotation Processing Tool (apt)", Java, Available online at <http://docs.oracle.com/javase/1.5.0/docs/guide/apt/GettingStarted.html#AnnotationProcessor>, Copyright 2004, 2010, 8 pages.

Oracle and/or its Affiliate, Available online at <https://blogs.oracle.com/darcy/resource/ProjectCoin/CloseableFinder.java>, Copyright 2016, 3 pages.

NetBeans, "What is a module" (last accessed on Dec. 6, 2016).

Morling, Gunnar, "[Jigsaw] Getting Bad Service Configuration File" Error with Annotation Processor, Available online at <http://mail.openjdk.java.net/pipermail/compiler-dev/2016-February/009985.html>, Feb. 9, 2016, 1 page.

McManus et al., "Plugging into the Java Compiler", JavaOne, 2014, 58 pages.

Hidalgo, Jorge, "JavaOne 2014—CON2013—Code Generation in the Java Compiler: Annotation Processors Do the Hard Work", Available online at <http://www.slideshare.net/deors/javaone-2014-con2013-code-generation-in-the-java-compiler-annotation-processorsdo-the-hard-work>, Oct. 1, 2014, 11 pages.

Github, "jboss-logging", Available online at <https://github.eom/jboss-logging/jboss-logging-tools/blob/2.0.1.Final/processor/src/main/java/org/jboss/logging/processor/apl/LoggingToolsProcessor.java>, Copyright 2016, 3 pages.

Github, "Dagger 2", Google, Available online at <https://github.com/google/dagger/>, Copyright 2012, 3 pages.

Github, "Dagger 1", Square, Available online at <https://github.com/square/dagger>, Copyright 2012, 2 pages.

Faycal et al., "An Agent Based Encapsulator System for Integrating and Composing Legacy System Functionalities", Proceedings of the 2015 IEEE/WIC / ACM International Conference on Web Intelligence and Intelligent Agent Technology (WI-IAT), vol. 1, Dec. 6-9, 2015, pp. 84-87.

Darcy, Joseph D., "Properties via Annotation Processing", Oracle Weblog, Java, Available online at <https://blogs.oracle.com/darcy/entry/properties_via_annotationjDrocessing>, Sep. 2, 2009, 6 pages.

Darcy, Joseph D., "Project Coin: Bringing it to a Close(able)", Oracle Weblog, Java, Available online at<https://blogs.oracle.com/darcy/enlry/project_coin_bring_close>, Jul. 6, 2010, 5 pages.

Darcy, Joseph D., "JSR 269 Maintenance Review for Java SE 8", Oracle Weblog, Java, Available online at <https://blogs.oracle.com/darcy/tags/annotationprocessing>, Dec. 8, 2013, 9 pages.

Buckley, Alex, "Project Jigsaw: Under The Hood", Java Platform Group, Oracle, Oct. 2015, 62 pages.

Breslav, Andrey, "kapt: Annotation Processing for Kotlin", Kotlin Blog, Available online at <http://blog.jetbrains.com/kotlin/2015/05/kapt-annotation-processing-for-kotlin/>, May 21, 2015, 8 pages.

Breslav, Andrey, "Better Annotation Processing: Supporting Stubs in kapt", Kellin Blog, Available online at <http:/blog.jetbrains.com/kotlin/2015/06/betler-annotation-processing-supporting-stubs-in-kapt/>, Jun. 22, 2015, 6 pages.

Bracha et al., "Mirrors: Design Principles for Meta-level Facilities of Object-Oriented Programming Languages", OOPSLA '04 Proceedings of the 19th annual ACM SIGPLAN conference on Object-oriented programming, systems, Languages, and applications, Oct. 24-28, 2004, 14 pages.

(56) References Cited

OTHER PUBLICATIONS

"Dalvik Optimization and Verification With dexopt," 2008 The Android Open Source Project, downloaded from http://www.netmite.com/android/mydroid/dalvik/docs/dexopt.html on Feb. 22, 2012, 4 pages.

".Dex—Dalvik Executable Format," 2007 The Android Open Source Project, downloaded from http://www.netmite.com/android/mydroid/dalvik/docs/dex-format.html on Feb. 22, 2012, 26 pages.

\* cited by examiner

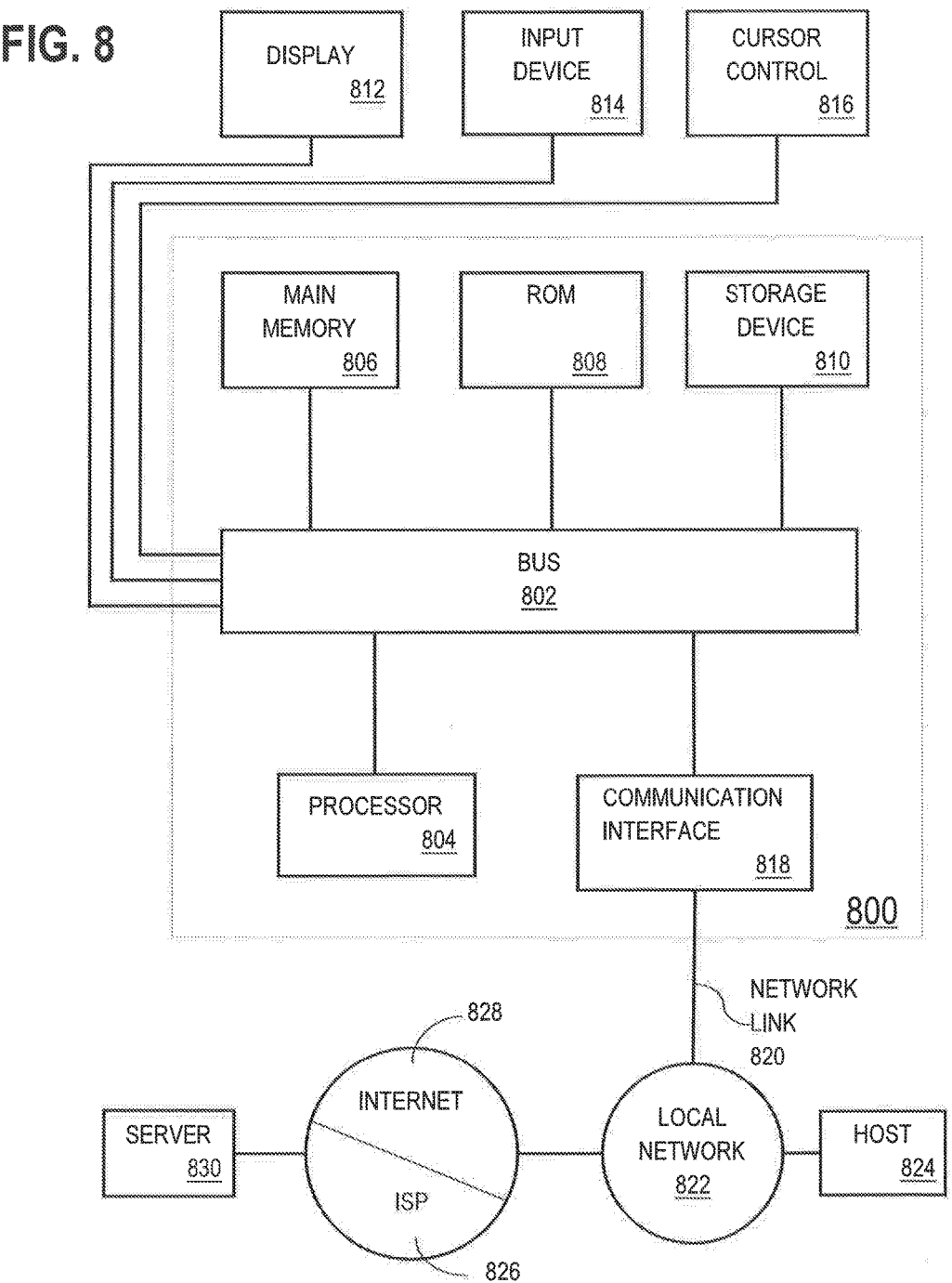

RETURNING A RUNTIME TYPE LOADED FROM AN ARCHIVE IN A MODULE SYSTEM

RELATED APPLICATIONS; INCORPORATION BY REFERENCE

This application is related to U.S. patent application Ser. No. 13/436,476, filed Mar. 30, 2012; U.S. patent application Ser. No. 14/634,385, filed Feb. 27, 2015; U.S. patent application Ser. No. 14/847,800, filed Sep. 8, 2015; and U.S. patent application Ser. No. 14/847,833, filed Sep. 8, 2015; each of which is hereby incorporated by reference in its entirety.

TECHNICAL FIELD

The present disclosure relates to returning a runtime type loaded from an archive. In particular, the present disclosure relates to returning a runtime type loaded from an archive based on a visibility boundary of a class loader in a module system.

BACKGROUND

A compiler converts source code, which is written according to a specification directed to the convenience of the programmer, to either machine or object code, which is executable directly by the particular machine environment, or an intermediate representation ("virtual machine code/instructions"), such as bytecode, which is executable by a virtual machine that is capable of running on top of a variety of particular machine environments. The virtual machine instructions are executable by the virtual machine in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine resides.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 8 illustrates a system in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. MODULE SYSTEM
   3.1 OBSERVABILITY
   3.2 READABILITY
   3.3 ACCESSIBILITY
   3.4 READABILITY GRAPH
4. CLASS LOADERS
   4.1 OBSERVABILITY BOUNDARY OF A CLASS LOADER
   4.2 VISIBILITY BOUNDARY OF A CLASS LOADER
5. ARCHIVE
6. ARCHIVE DUMPING
7. ARCHIVE LOADING IN A MODULE SYSTEM
8. MISCELLANEOUS; EXTENSIONS
9. HARDWARE OVERVIEW

1. General Overview

One or more embodiments include returning a runtime type, loaded based on an archived runtime type from an archive, based on a visibility boundary of a class loader in a module system. The visibility boundary of the class loader is defined based on (a) a readability graph associated with the module system, and (b) a set of module-to-loader mappings associated with the class loader. If the archived runtime type is within the visibility boundary of the class loader, then the class loader may load the runtime type based on the archived runtime type. A runtime type (or archived runtime type) that is within a visibility boundary of a particular class loader may also be referred to herein as being "defined to" the particular class loader.

In one or more embodiments, a class loader, implemented in a runtime environment, identifies an archived runtime type loaded into an archive from a module source. The class loader identifies a particular package associated with the archived runtime type. The class loader determines whether the particular package is included in any runtime module that is defined to (i) the class loader or (ii) any class loader in a class loader hierarchy to which the class loader delegates. If the particular package is included in a runtime module that is defined to (i) the class loader or (ii) any class loader in the class loader hierarchy to which the class loader delegates, then the class loader may return a runtime type loaded based on the archived runtime type from the archive.

One or more embodiments described in this Specification and/or recited in the claims may not be included in this General Overview section.

2. Architectural Overview

Figure 1:
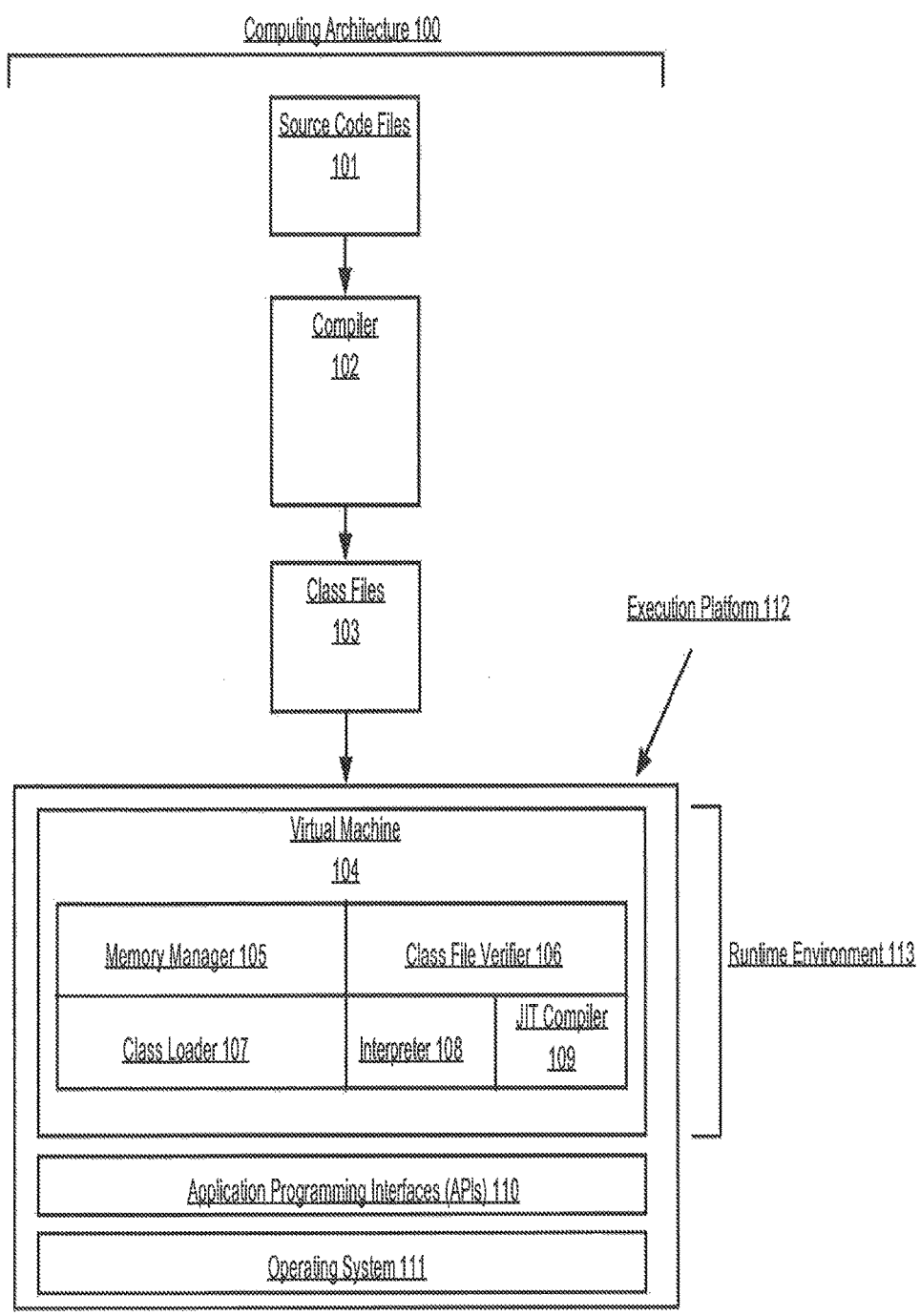
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, one or more class loaders 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the Java Virtual Machine (JVM), the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "type" defined in the source code files 101 (or dynamically generated by the compiler 102/virtual machine 104). Examples of "types" include a class and an interface. A class is a template for the properties and behaviors of objects associated with the class. The class includes fields and methods associated with the objects of the class. An interface includes abstract methods that may be implemented by a class. A class that implements an interface inherits the abstract methods of the interface and provides a body to each abstract method. However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of types that provide related functionality. For example, a library may contain one or more class files that implement input/output (I/O) operations, mathematics tools, cryptographic techniques, graphics utilities, and so forth. Further, some types (or fields/methods within those types) may include access restrictions that limit their use to within a particular class/library/package or to classes with appropriate permissions.

2.1 Example Class File Structure

Figure 2:
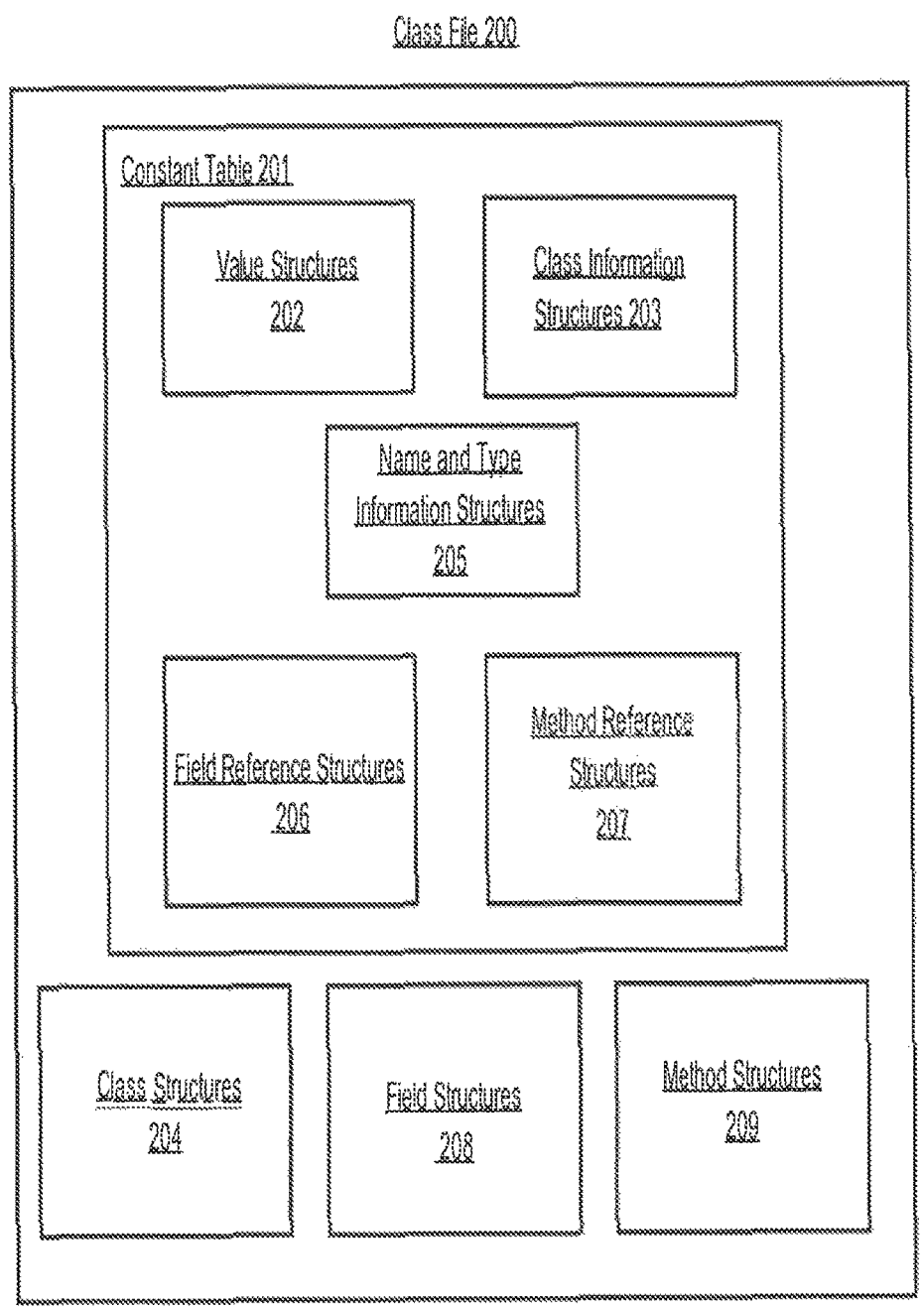
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class (or type) represented by the class file 200.

In FIG. 2, the class file 200 includes a constant table 201, field structures 208, class structures 204, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class.

The name and type information structures 205 hold an index into the constant table 201 to one of the value structures 202 storing the name of the field/method and an index into the constant table 201 to one of the value structures 202 storing the descriptor.

In an embodiment, class structures 204 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameter type(s) of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 112. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
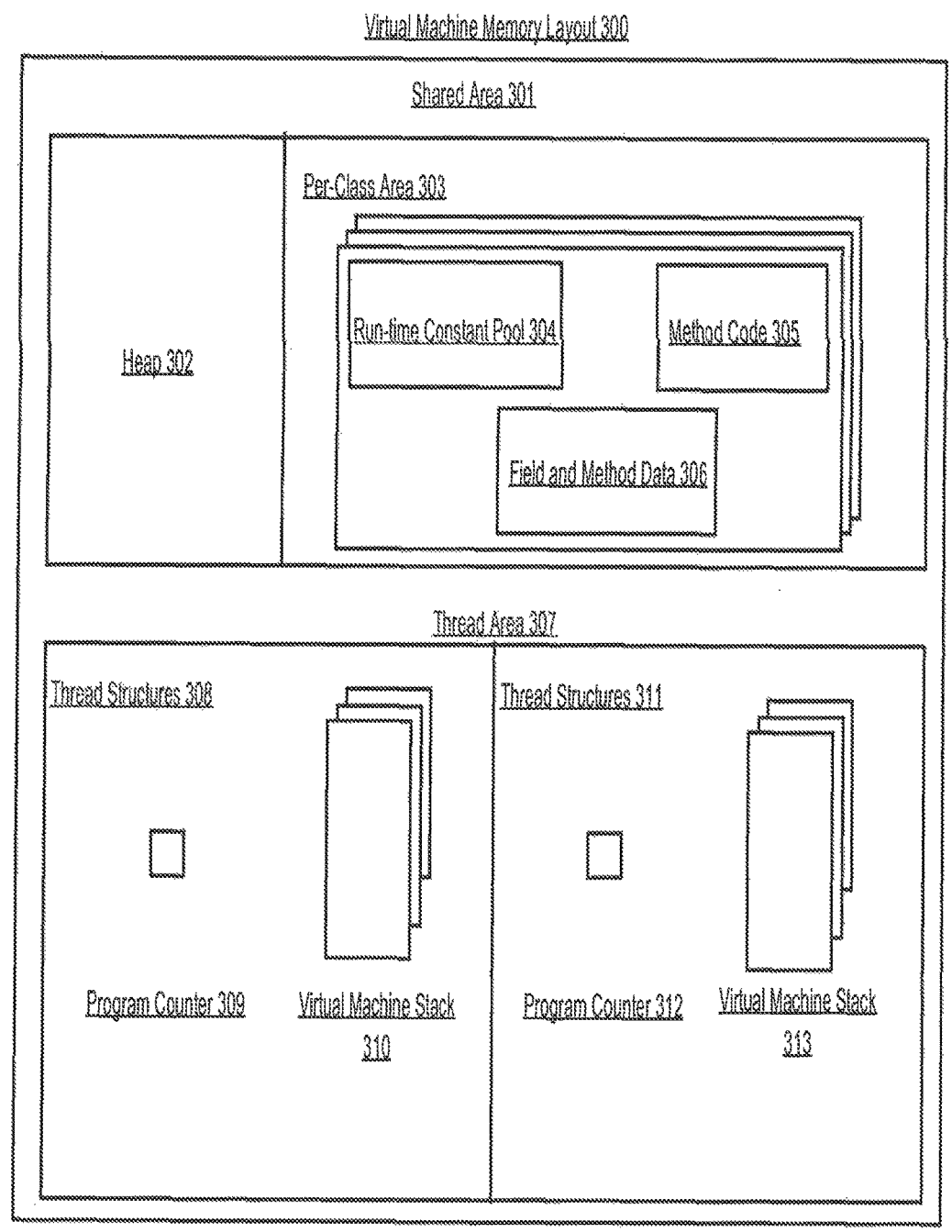
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
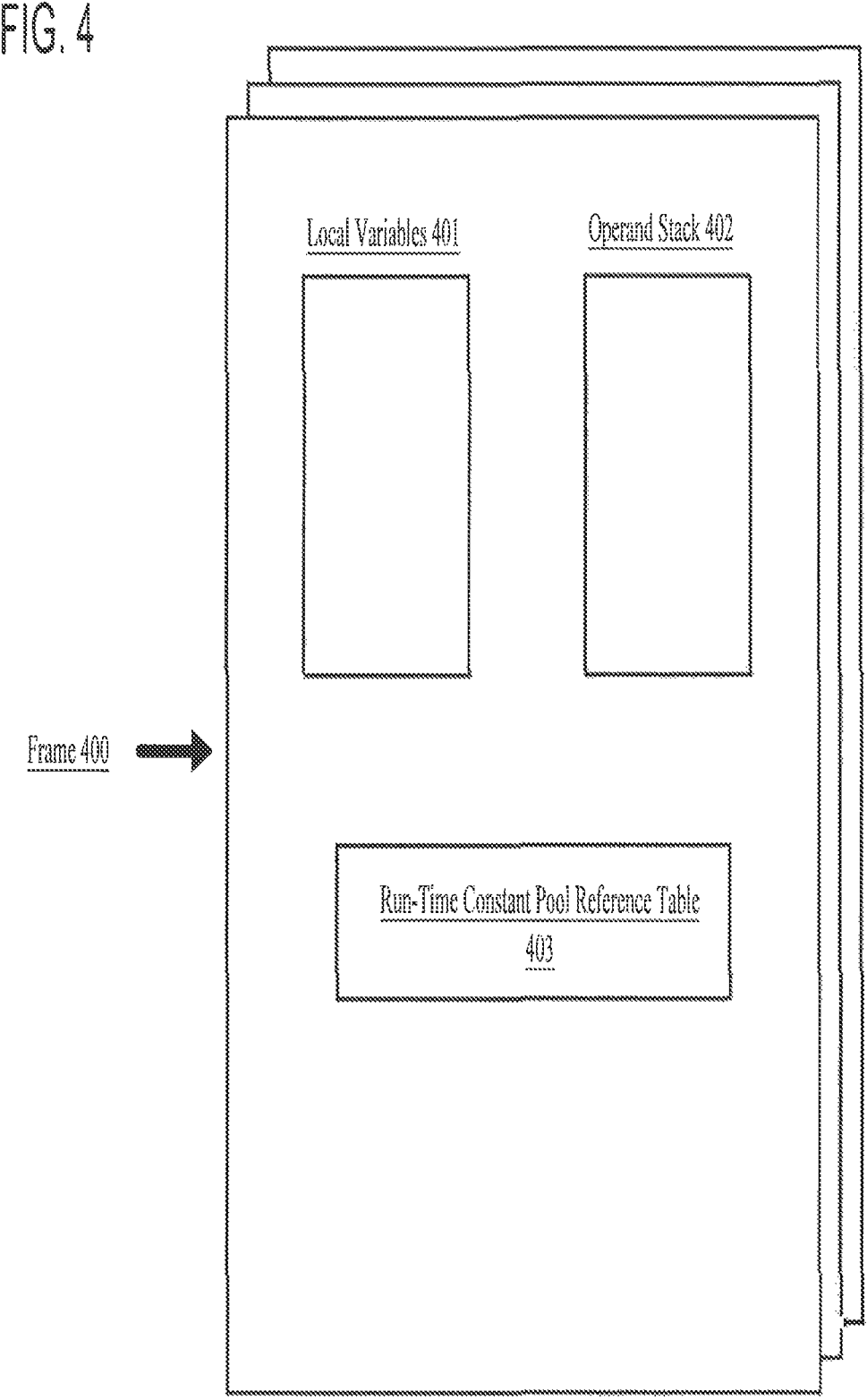
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes types such as classes and interfaces. Loading is the process of finding a class (or type) with a particular name and creating a representation from the associated class file 200 of that class within the memory of the runtime environment 112. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking a class loader 107 which loads an initial class. The technique by which the initial class is specified will vary from embodiment to embodiment. For example, one technique may have the virtual machine 104 accept a command line argument on startup that specifies the initial class.

To load a class (or an interface or another type), the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303. The loaded type may be referred to herein as a "runtime type."

In some embodiments, when the class loader 107 loads a class, the class loader 107 also recursively loads the super-classes of the loaded class. The class loader 107 may also recursively load the required pre-loaded classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class conforms to one or more static constraints and/or structural constraints. Static constraints are those defining the well-formedness of the class file. Structural constraints specify constraints on relationships between instructions of one or more class file. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory addresses from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Module System

In an embodiment, a module system is a system for implementing code that is organized in a set of modules. Types of modules include: named explicit modules, named automatic modules, and unnamed modules.

In an embodiment, a named explicit module is a self-describing collection of code and/or data. The code is organized as a set of one or more packages (also referred to herein as "libraries"). Each package includes one or more types (such as classes and interfaces). A particular module's self-description is expressed in the particular module's module declaration. The module declaration declares the name (or other reference) of the particular module.

Additionally or alternatively, the module declaration identifies one or more other modules on which the particular module depends. The dependency between modules may be expressed using, for example, a requires clause. As an example, Module A depends on Module B, if a type associated with Module A references a type associated with Module B. A module declaration of Module A may include, "requires Module B," to indicate the dependency.

Additionally or alternatively, the module declaration identifies one or more packages of the particular module that are exported to other modules. The exportation may be expressed using, for example, an exports clause. Types, of the exported packages, that have been declared as public may be available for use by other modules.

A named explicit module may be packaged into a module artifact. The module artifact includes class files of the types associated with the packages of the module. The module artifact also includes the module declaration of the module. The module artifact may be a compressed version of the contents. Various formats may be used to store a module artifact, including but not limited to a Java Archive (JAR) file format, ZIP file format, and JMOD file format. A module artifact may also be referred to herein as a "module source."

Named explicit modules may be modules that are built into a compile-time environment or runtime environment 112. A runtime image may store code and data associated with the runtime environment 112, including the built-in modules.

Additionally or alternatively, named explicit modules may be found on a module path, which is defined by the host system. The module path is an ordered list of entries. Each entry is either a module artifact or a directory including module artifacts. Further description of the module path is included below in Section 4.1, titled "Observability Boundary of a Class Loader."

In an embodiment, an unnamed module includes one or more types (1) whose package(s) are not defined in any named explicit module and (2) that are loaded from a namespace, which is defined by the host system. The namespace is an ordered list of entries. Each entry is a type, or a directory or artifact including types. Further description of the namespace is included below in Section 4.1, titled "Observability Boundary of a Class Loader."

The unnamed module does not include any explicit module declaration. The unnamed module includes an implicit dependency to every other module in the module system. The unnamed module includes an implicit exportation of all of its type groups. However, a named explicit module is not allowed to depend on an unnamed module.

In an embodiment, a named automatic module (also referred to herein as an "automatic module") includes one or more types (1) whose package(s) are not defined in any named explicit module and (2) that are loaded from a module path. The automatic module does not include any explicit module declaration. The automatic module includes an implicit dependency to every other module in the module system. The automatic module includes an implicit exportation of all of its type groups. Meanwhile, a named explicit module is allowed to depend on a named automatic module.

In an embodiment, a module system enforces a set of encapsulation boundaries associated with the modules. Encapsulation boundaries may comprise (a) readability boundaries and/or (b) accessibility boundaries, as described below. Encapsulation boundaries are also based on observability, as described below. Further descriptions of encapsulation boundaries are included in U.S. patent application Ser. No. 14/847,800, filed Sep. 8, 2015, and U.S. patent application Ser. No. 14/847,833, filed Sep. 8, 2015, each of which is incorporated by reference in its entirety.

3.1 Observability

In an embodiment, a module is "observable" if a compiler or virtual machine (such as, JVM) is able to find the module. Observable modules include but are not limited to (1) modules included in module artifacts of the module path, (2) modules built into the compile-time environment or runtime environment 112 (which may be stored in a runtime image), and (3) an unnamed module associated with the namespace. Types that are within packages of observable modules are referred to herein as "observable types."

Observability may be modified by a host system using, for example, a -limitmods statement in a command line. As an example, limiting the observable modules may be useful for debugging. As another example, limiting the observable modules reduces the number of modules resolved when the main module is the unnamed module defined by the application class loader for the application class path.

3.2 Readability

In an embodiment, a first module is "readable" to a second module if the second module explicitly or implicitly depends on the first module. Given an initial observable module with one or more explicit dependencies, the module system performs resolution to determine a readability graph associated with the module system. During resolution, the module system locates a first set of observable modules to fulfill the explicit dependencies of the initial observable module. The module system locates a second set of observable modules to fulfill the explicit dependencies of the first set of modules. The module system recursively fulfills the explicit dependencies of all observable modules already identified in the readability graph.

Related to the concept of readability is "type visibility." A first type associated with a first module is "visible" to a second type associated with a second module, if the second module explicitly or implicitly depends on the first module.

3.3 Accessibility

In an embodiment, a first type of a first module is "accessible" to a second type of a second module if (1) the second module explicitly or implicitly depends on the first module, and (2) the first module explicitly or implicitly exports the first type. An additional requirement may be that the first type is declared as being public. Accessibility may be strictly enforced by a module system. If a type of one module references another type of another module that is not accessible, then the module system causes an error to be thrown.

3.4 Readability Graph

Figure 5:
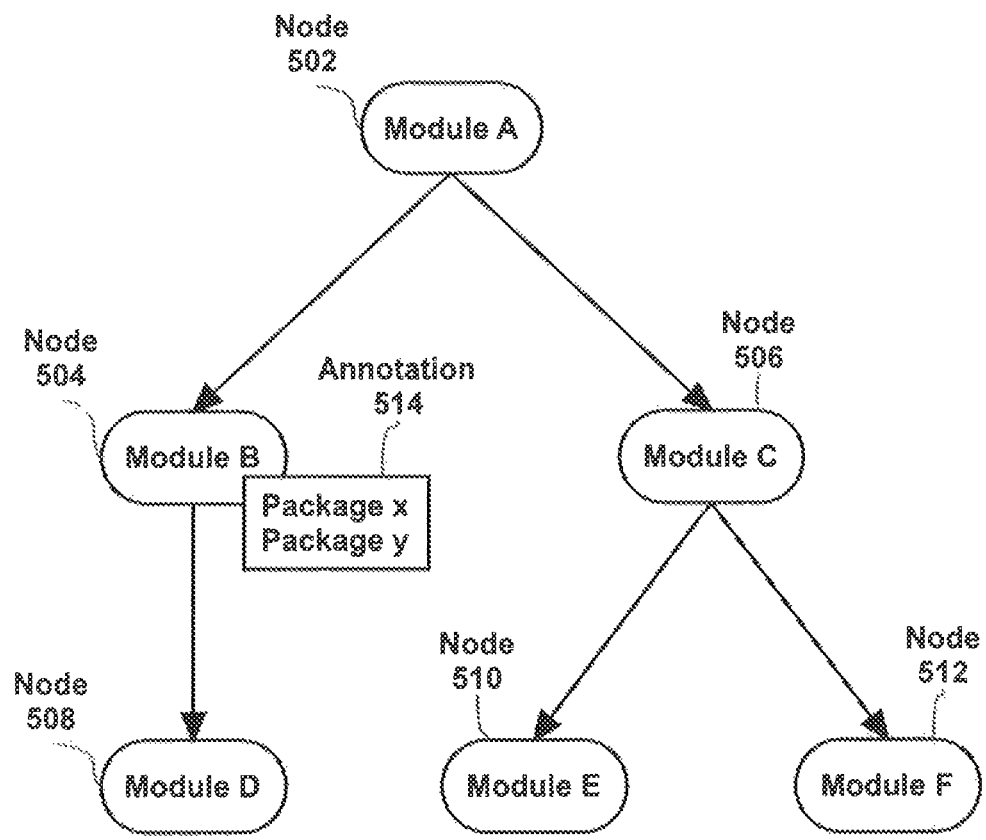
FIG. 5 illustrates an example of a portion of a readability graph, in accordance with an embodiment.

In an embodiment, a module system may be represented by a readability graph (also referred to herein as a "module graph"). In a readability graph, each module is represented by a node. A dependency between a first module and a second module is represented by a connection between a node representing the first module and a node representing the second module. FIG. 5 illustrates an example of a portion of a readability graph, in accordance with an embodiment.

As an example, an initial observable module may include the following module declaration:

```
module A {
    requires B;
    requires C;
}
```

The module system then identifies module B and module C, as follows:

```
module B {
    requires D;
    exports x;
    exports y;
}
module C {
    requires E;
    requires F;
}
```

As illustrated, node 502 represents module A, node 504 represents module B, node 506 represents module C, node 508 represents module D, node 510 represents module E, and node 512 represents module F. For simplicity and clarity, additional modules that are necessary to fulfill any dependencies of module D, module E, and module F are not illustrated.

Node 502 is connected to node 504 and node 506. Node 504 is connected to node 508. Node 506 is connected to node 510 and node 512. The lines connecting the nodes represent dependency relationships between the modules represented by the nodes.

Node 504, representing module B, is annotated with annotation 514. Annotation 514 identifies packages exported by module B, which are package x and package y.

4. Class Loaders

Figure 6:
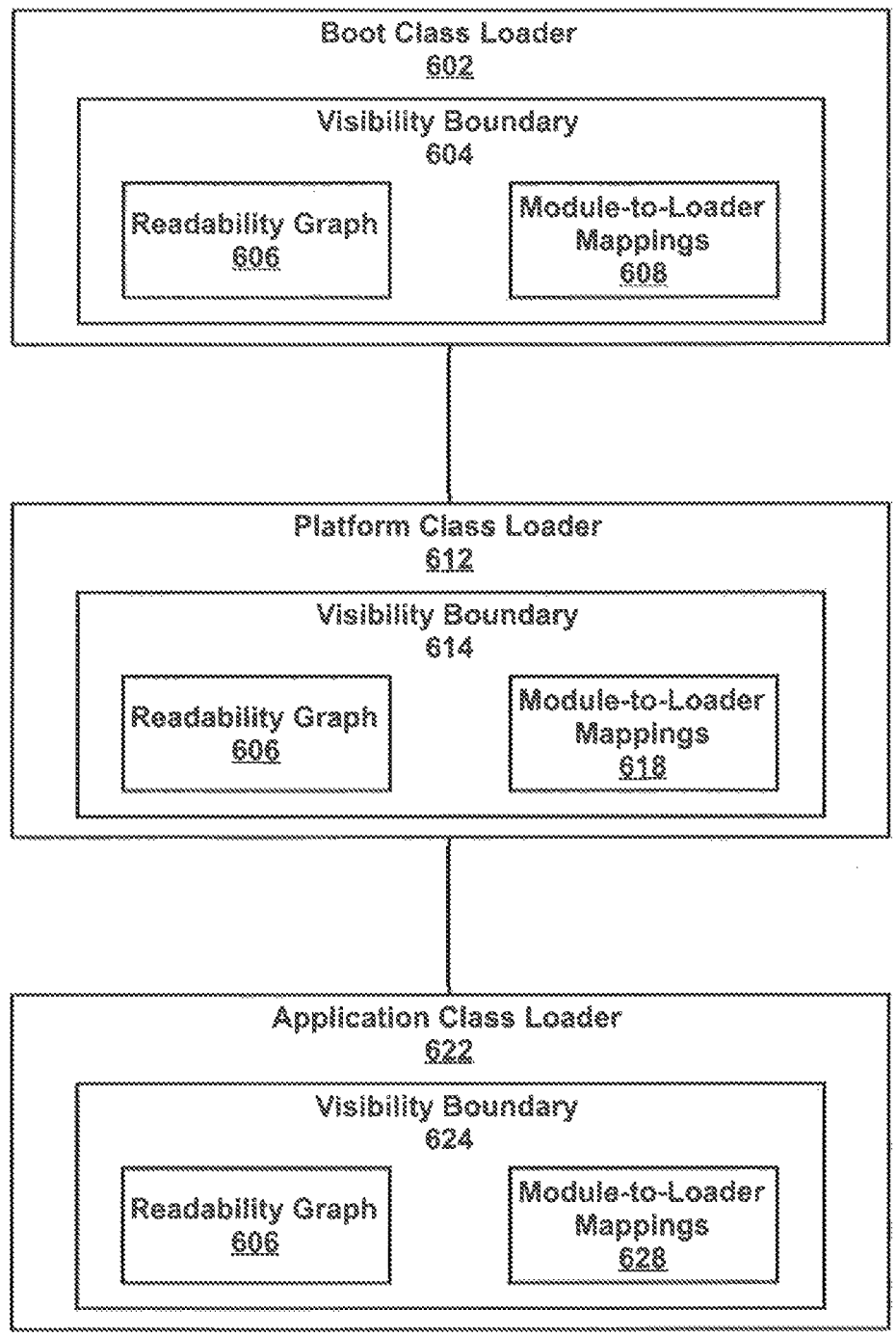
FIG. 6 illustrates examples of class loaders in block diagram form according to an embodiment.

Class loading, linking, and initializing are described above in Section 2.3, titled "Loading, Linking, and Initializing." FIG. 6 illustrates examples of class loaders in block diagram form according to an embodiment. A runtime environment 112 may have one or more class loaders. Examples of class loaders include boot class loader 602, platform class loader 612 (also referred to as an "extension class loader"), and application class loader 622. Additional or alternative class loaders may be used.

Class loaders 602, 612, 622 of a runtime environment 112 are associated with a class loader hierarchy. Each class loader, except for boot class loader 602, is associated with a parent class loader. As an example, boot class loader 602 may be a parent of platform class loader 612. Platform class loader 612 may be a parent of application class loader 622.

When a particular class loader receives a request to load a runtime type, the particular class loader may delegate to a parent class loader prior to attempting to load the runtime type itself. If the parent class loader is unsuccessful in loading the runtime type, then the particular class loader attempts to load the runtime type. The particular class loader is referred to as the "initiating class loader." The class loader that successfully loads the runtime type is referred to as the "defining class loader." Example operations for delegation and/or other interaction between class loaders are described below with reference to FIG. 7A.

As illustrated in FIG. 6, boot class loader 602 and platform class loader 612 are referred to herein as being in a "class loader hierarchy" to which the application class loader 622 delegates.

4.1 Observability Boundary of a Class Loader

In an embodiment, an observability boundary of a class loader is defined by the locations (such as URLs) that are searched by the class loader in order to load a runtime type. The locations may include (a) locations included in a namespace, (b) locations included in a module path, and (c) a location of a runtime image. Different namespaces and/or module paths are associated with different class loaders. If a particular type is not found within an observability boundary associated with a particular class loader, then the particular class loader cannot load the particular type.

A namespace (also referred to as a "class search path" or "class path") associated with a particular class loader includes an ordered set of entries that are searched, by the particular class loader, to load a runtime type from an unnamed module (or a set of non-modular code that does not include a module declaration). The search is conducted according to the sequence of the ordered set of entries. The first entry that is found to define the runtime type to be loaded is used to load the particular type.

An entry may be a URL (or other location identifier) associated with a class file or an artifact (such as, a JAR file or a module artifact). Alternatively, an entry may be a URL (or other location identifier) of a directory including a class file or an artifact. As an example, a URL of a JAR file in a namespace may be: . . . /java/embedded/users/joe_smith/tests/hw.jar.

A namespace is defined by a host system. In an embodiment, a namespace of boot class loader 602 comprises a boot append class path. A namespace of platform class loader 612 comprises a platform class path, which may be stored in a "/ext" directory or other directory(s). A namespace of application class loader 622 comprises an application class path defined using, for example, a -cp statement or a -classpath in a command line. Alternatively, a namespace of application class loader 622 is defined using, for example, a CLASSPATH environment variable of a development toolkit.

A module path associated with a particular class loader includes an ordered set of entries that are searched, by the particular class loader, to load a runtime type from a named module (such as a named explicit module or a named automatic module). The search is conducted according to the sequence of the ordered set of entries. The first entry that is found to define the runtime type to be loaded is used to load the particular type.

An entry may be a URL (or other location identifier) associated with a module artifact. Alternatively, an entry may be a URL (or other location identifier) of a directory including a module artifact.

A module path is defined by a host system. A module path may be defined in, for example, a -modulepath statement in a command line.

4.2 Visibility Boundary of a Class Loader

In an embodiment, each class loader is associated with a visibility boundary (such as visibility boundary 604, visibility boundary 614, or visibility boundary 624). A visibility boundary of a class loader is defined based on (a) a readability graph 606 associated with the module system, and (b) a set of module-to-loader mappings associated with the class loader (such as module-to-loader mappings 608, module-to-loader mappings 618, or module-to-loader mappings 628). A runtime module that is (a) in the readability graph and (b) associated with a particular class loader based on a module-to-loader mapping may be referred to herein as being "defined to" the particular class loader. A runtime type is within the visibility boundary of a particular class loader if the runtime type is declared in a package that is defined to a runtime module that is defined to the particular class loader.

An example of a readability graph 606 is described in Section 3.4 above, titled "Readability Graph." A readability graph 606 is defined based on an initial observable module defined in a runtime environment and one or more additional observable modules in the module system. The readability graph 606 is associated with the module system. The readability graph 606 is the same for each class loader in the runtime environment. If a particular runtime module is not within the readability graph 606, then the runtime types declared in packages that are defined to the particular runtime module are not within the visibility boundary of any class loader in the runtime environment.

A set of module-to-loader mappings are included in a set of runtime metadata for a runtime environment. Different module-to-loader mappings may be associated with different class loaders. As illustrated, module-to-loader mappings 608 is associated with boot class loader 602. Module-to-loader mappings 618 is associated with platform class loader 612. Module-to-loader mappings 628 is associated with application class loader 622.

A module-to-loader mapping associated with a particular class loader identifies a name (or other reference) of a particular module that may be defined to the particular class loader. The module-to-loader mapping may additionally identify a Uniform Resource Locator (URL) (or other location identifier) associated with the particular module. If a particular runtime module is not within a module-to-loader mapping associated with a particular class loader, then the runtime types declared in packages that are defined to the particular runtime module are not within the visibility boundary of the particular class loader.

Conversely, if a particular runtime module is (1) within the readability graph 606, and (2) within the module-to-loader mappings associated with a particular class loader, then the runtime types declared in packages that are defined to the particular runtime module are within the visibility boundary of the particular class loader.

5. Archive

As described above in Section 2.3, titled "Loading, Linking, and Initializing," a runtime type is a type that has been loaded into an internal memory of a particular virtual machine. The internal memory of the particular virtual machine is not directly shared with other virtual machines. Another virtual machine may not load the runtime type from the internal memory of the particular virtual machine.

In contrast, multiple virtual machines may load a runtime type based on an archived runtime type from an archive (also referred to herein as a "shared archive"). The archive is a re-mappable portion of memory that is shared amongst multiple virtual machines. When a particular virtual machine is initialized, the archive (including the archived runtime type) is memory-mapped and/or copied into the internal memory of the particular virtual machine. During class loading, a class loader of the particular virtual machine may pass the archived runtime type from the internal memory as a runtime type to the particular virtual machine. Passing the archived runtime type from the internal memory as a runtime type to the particular virtual machine may be referred to herein as "loading the runtime type from the archive" and/or "loading the runtime type based on the archived runtime type." The ability to allow multiple virtual machines to access an archive is also referred to as "Class Data Sharing." Further descriptions of class data sharing are included in at least, U.S. patent application Ser. No. 13/436,476, filed Mar. 30, 2012, which is incorporated by reference in its entirety.

6. Archive Dumping

Archive dumping is the process of storing archive metadata, including an archived runtime type, into the archive. One or more types to be archived may be identified in an archive list. The archive list may be provided via a command line.

A class loader of a virtual machine searches for a class file defining a particular type included in the archive list. The class loader searches for the class file in (a) a runtime image, (b) namespace(s), (c) module path(s), and/or (d) other location(s) identified via a command line. The searched namespaces and/or module paths may be associated with the class loader itself or a different class loader. Upon finding the class file defining the particular type, the class loader loads a runtime type corresponding to the particular type.

After the runtime type is loaded, the virtual machine dumps the runtime type as an archived runtime type into an archive. The archived runtime type is associated with an archived runtime type reference. The archived runtime type reference comprises a [type, defining class loader type reference] pair. The defining class loader type reference identifies the class loader that will directly load the runtime type from the archive, as opposed to indirectly returning the runtime type through delegation to a parent class loader.

As an example, a boot class loader of a virtual machine may search for a class file corresponding to Type X The boot class loader may load Runtime Type X' based on Type X The virtual machine may dump Runtime Type X' as Archived Runtime Type X into an archive. Archived Runtime Type X is associated with the following archived runtime type reference: [Type X, boot class loader].

Additionally, the virtual machine stores, in the archive, an identification of a source from which the archived runtime type was loaded. The virtual machine may store an identification of the runtime image as the source from which the archived runtime type was loaded. The virtual machine may store a URL corresponding to the runtime image. Alternatively, the virtual machine may store an identification of a particular namespace or module path from which the archived runtime type was loaded. The particular namespace or module path may be associated with the class loader that loaded the runtime type or a different class loader. The virtual machine may store an entry (such as a URL) of the particular namespace or module path from which a class file corresponding to the particular type was found.

The information stored in the archive may be referred to herein as "archive metadata." Archive metadata may include one or more of the following: the archived runtime type; the archived runtime type reference; an identification of a source of the class file; and/or other information related to loading or linking performed during archive dumping.

Further descriptions of archive dumping are included in at least U.S. patent application Ser. No. 14/634,385, filed Feb. 27, 2015, which is incorporated by reference in its entirety.

7. Archive Loading in a Module System

Figure 7A:
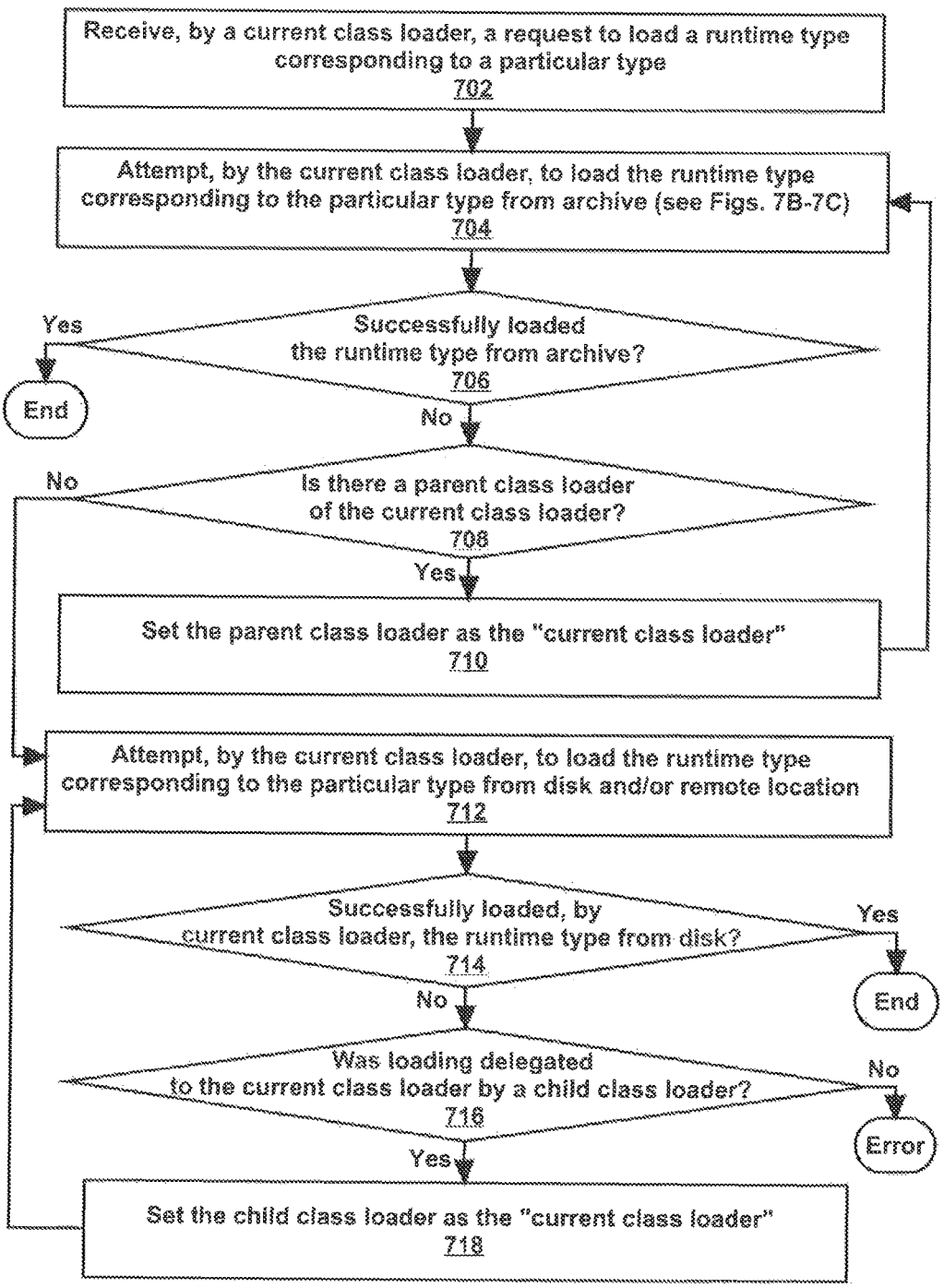
FIG. 7A illustrates an example set of operations for loading a runtime type from an archive by a class loader according to an embodiment.

FIG. 7A illustrates an example set of operations for loading a runtime type from an archive by a class loader according to an embodiment. One or more operations illustrated in FIG. 7A may be modified, rearranged, or omitted all together. Accordingly, the particular sequence of operations illustrated in FIG. 7A should not be construed as limiting the scope of one or more embodiments.

In one or more embodiments, a current class loader of a virtual machine receives a request to load a runtime type corresponding to a particular type (Operation 702). The request may have been triggered by an execution of another runtime type that references the particular type. For example, the other runtime type may include a reference to an object and/or a method of the particular type.

The current class loader may be any class loader of a virtual machine, such as a boot class loader, a platform class loader, or an application class loader. The class loader that receives the request to load the runtime type corresponding to the particular type is also referred to herein as an "initiating class loader."

In one or more embodiments, the current class loader attempts to load the runtime type from an archive (Operation 704). The attempt to load based on an archived runtime type includes determining whether the archived runtime type is within an observability boundary of the current class loader. The attempt to load based on an archived runtime type includes determining whether the archived runtime type is within a visibility boundary of the current class loader. An example set of operations for verifying whether an archived runtime type is within an observability and/or visibility boundary of a class loader is described below with reference to FIGS. 7B-7C. Additional or alternative operations may be performed. If the archived runtime type is not within the visibility boundary of the current class loader, then the current load does not load the runtime type from the archive.

One or more embodiments include determining whether the runtime type was successfully loaded from the archive (Operation 706). If the runtime type was successfully loaded from the archive, then the process ends. The runtime type is loaded into an internal memory of the virtual machine. The current class loader is also referred to herein as a "defining class loader." If the runtime type was not successfully loaded from the archive, then the process continues.

One or more embodiments include determining whether there is a parent class loader of the current class loader (Operation 708). Each class loader, except the boot class loader, is associated with a parent class loader.

If there is a parent class loader, then the parent class loader is set as the "current class loader" (Operation 710). Operations 704-710 are reiterated until a current class loader with no parent class loader is traversed. A current class loader with no parent class loader may be a boot class loader.

If a class loader that is traversed successfully loads the runtime type from the archive, then the process ends. If the class loader that successfully loads the runtime type (the defining class loader) is the same as the initiating class loader, then the initiating class loader is said to "directly return" the runtime type loaded from the archive. If the class loader that successfully loads the runtime type (the defining class loader) is different from the initiating class loader, then the defining class loader passes the runtime type to the initiating class loader. The initiating class loader is said to "indirectly return" the runtime type loaded from the archive.

If the runtime type is not successfully loaded from the archive, and the current class loader has no parent class loader, then the current class loader attempts to load the runtime type corresponding to the particular type from disk and/or remote location, according to an embodiment (Operation 712). The current class loader searches through the namespace and/or module path associated with the current class loader for a class file corresponding to the particular type. If a class file corresponding to the particular type is found, then the current class loader loads the runtime type based on the class file. If a class file corresponding to the particular type is not found, then the current class loader does not load the runtime type.

One or more embodiments include determining whether the current class loader successfully loaded the runtime type from the disk and/or remote location (Operation 714). If the runtime type was successfully loaded from the disk and/or remote location, then the process ends. The runtime type is loaded into an internal memory of the virtual machine. The current class loader is also referred to herein as a "defining class loader." If the runtime type was not successfully loaded from the disk and/or remote location, then the process continues.

One or more embodiments include determining whether the loading performed by the current class loader was delegated to the current class loader by a child class loader (Operation 716). This determination may be made by determining whether the current class loader was identified as a parent class loader at Operation 708. The loading was delegated to the current class loader if the current class loader was identified as a parent class loader at Operation 708. Additionally or alternatively, this determination may be made by determining whether the current class loader is the initiating class loader that received the request to load the runtime type corresponding to the particular type at Operation 702. The loading was delegated to the current class loader if the current class loader is not the initiating class loader.

If the loading was delegated by a child class loader, then the child class loader is set as the "current class loader" (Operation 718). Operations 712-718 are reiterated until the initiating class loader is traversed. If a class loader that is traversed successfully loads the runtime type from the disk and/or remote location, then the process ends.

If the runtime type is not successfully loaded, and the loading performed by the current class loader was not delegated by a child class loader, then an error is thrown. Neither the initiating class loader nor any class loader in a class loader hierarchy to which the initiating class loader delegates has successfully loaded the runtime type.

Figure 7B:
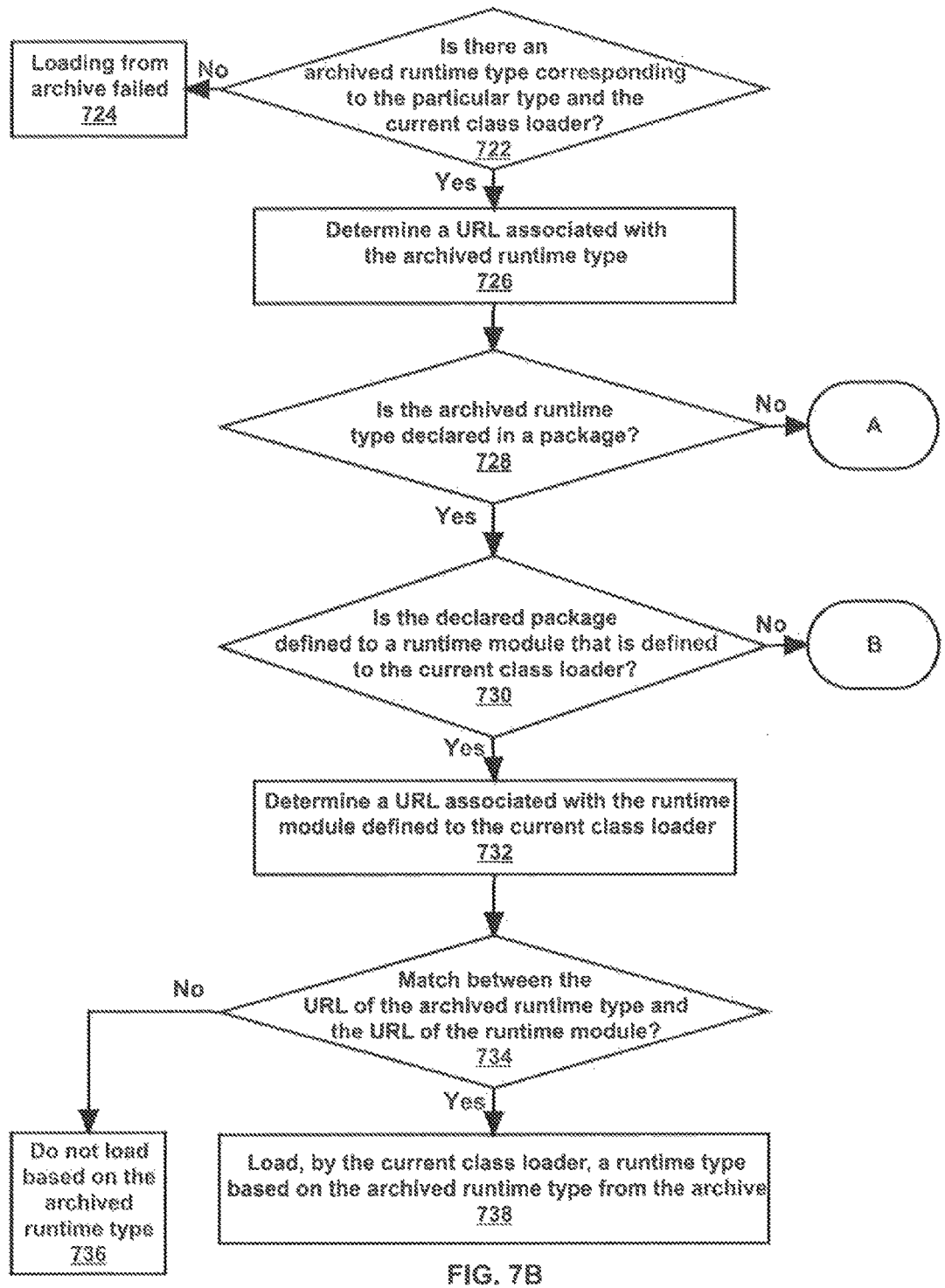
FIGS. 7B-7C illustrate an example set of operations for verifying whether an archived runtime type within an observability and/or visibility boundary of a class loader for loading a runtime type based on the archived runtime type, according to an embodiment.
Figure 7C:
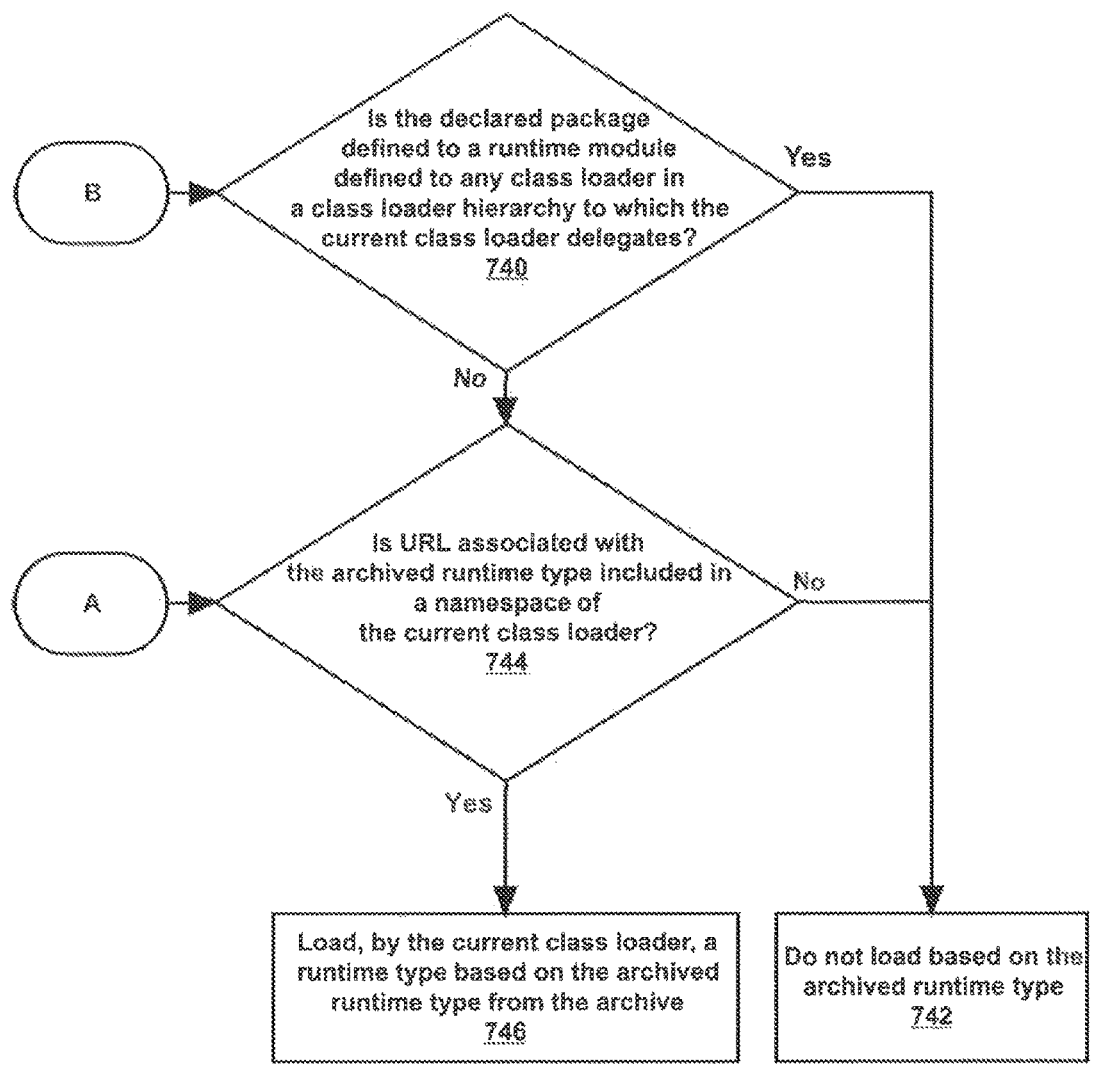

As described above with reference to Operation 704, a current class loader loads the runtime type, corresponding to the particular type, from the archive if the archived runtime type is within an observability boundary of the current class loader. Additionally or alternatively, the current class loader loads the runtime type, corresponding to the particular type, from the archive, if the archived runtime type is within a visibility boundary of the current class loader. The current class loader may be any class loader of the virtual machine. FIGS. 7B-7C illustrate an example set of operations for verifying whether the archived runtime type is within an observability and/or visibility boundary of the current class loader for loading the runtime type from the archive, according to an embodiment. One or more operations illustrated in FIGS. 7B-7C may be modified, rearranged, or omitted all together. Accordingly, the particular sequence of operations illustrated in FIG. 7B-7C should not be construed as limiting the scope of one or more embodiments.

One or more embodiments include determining whether there is an archived runtime type corresponding to the particular type and the current class loader (Operation 722). The particular type is specified in the request received at Operation 702.

As described above in Section 5, titled "Archive," during virtual machine initialization, the archive is memory-mapped and/or copied into an internal memory of the virtual machine. Also described above in Section 6, titled "Archive Dumping," archived runtime types are stored with corresponding archived runtime type references. Each archived runtime type reference comprises a [type, defining class loader type reference] pair. Hence, a search for an archived runtime type corresponding to the particular type and the current class loader may be conducted within the internal memory of the virtual machine, to which the archive was memory-mapped and/or copied. The search seeks an archived runtime type corresponding to an archived runtime type reference that identifies the [the particular type, the current class loader] pair.

If an archived runtime type corresponding to the particular type and the current class loader is not found, then loading from the archive fails for the current class loader (Operation 724). If an archived runtime type corresponding to the particular type and the current class loader is found, then the process continues.

One or more embodiments include determining a URL (or other location identifier) associated with the archived runtime type (Operation 726). The URL associated with the archived runtime type is identified from the archive metadata mapped into the internal memory of the virtual machine from the archive. The URL identifies the location of the class file from which the archived runtime type was loaded. As an example, the URL may be a location of a runtime image. As another example, the URL may be an entry of a namespace or module path.

One or more embodiments include determining whether the archived runtime type is declared in a package (Operation 728). The class loader may determine whether the archived runtime type includes, for example, a package statement. The package statement, if included in the archived runtime type, declares package membership for the archived runtime type. The package statement identifies a package of which the archived runtime type is a member.

Additionally or alternatively, the class loader may determine a package associated with the archived runtime type based on a URL associated with the archived runtime type. The URL associated with the archived runtime type identifies a directory from which a class file corresponding to the particular type is stored. During a particular runtime, the directory may include multiple class files belonging to the same particular package. The particular package may be identified based on the directory.

Additionally or alternatively, the class loader may determine a package associated with the archived runtime type based on archive metadata stored in the archive. The archive metadata may indicate a package associated with the archived runtime type.

One or more embodiments include determining whether the declared package is defined to a runtime module that is defined to the current class loader (Operation 730). A runtime module is a module that has been loaded, by a particular class loader, into an internal memory of the virtual machine. A runtime module may be identified by a [module, defining class loader type reference] pair. As described above in Section 4.2, titled "Visibility Boundary of a Class Loader," a runtime module that is (a) in the readability graph and (b) associated with a particular class loader based on a module-to-loader mapping may be referred to herein as being "defined to" the particular class loader. A particular runtime module identified as [Module A, Class Loader B] is in the readability graph, if the readability graph includes Module A.

A readability graph associated with the module system is identified. The readability graph is generated based on a recursive resolution of the dependencies of each module, starting with an initial observable module that may be defined on a command line.

A set of module-to-loader mappings corresponding to the current class loader is identified. The module-to-loader mappings may be associated with a particular runtime environment. The module-to-loader mappings include a name (or other reference) of one or more modules that may be defined to the current class loader.

If the archived runtime type is declared in a package which is defined to a runtime module that is (a) within the readability graph and (b) included in the set of module-to-loader mappings of the current class loader, then the archived runtime type is within the visibility boundary of the current class loader. The runtime module is "defined to" the current class loader.

The observability boundary and/or visibility boundary of the current class loader may vary in different runtime environments. As an example, in a first runtime environment, a -limitmods statement may be used to specify a particular set of observable modules. The particular set of observable modules are used to define a readability graph, which forms a basis of a visibility boundary for a particular class loader. In a second runtime environment, a -limitmods statement may be used to specify a different set of observable modules. The different set of observable modules forms a different readability graph and hence a different visibility boundary for the particular class loader.

One or more embodiments include determining a URL (or other location identifier) associated with the runtime module defined to the current class loader (Operation 732). The URL associated with the runtime module defined to the current class loader is identified from the set of module-to-loader mappings of the current class loader.

One or more embodiments include determining whether there is a match between (a) the URL of the archived runtime type determined at Operation 726 and (b) the URL of the runtime module defined to the current class loader determined at Operation 732 (Operation 734). A match is found if the URLs are the same. This determination verifies that the module defined to the current class loader in the module-to-loader mappings corresponds to the runtime module that defines the package in which the archived runtime type is declared.

If there is no match between the URLs, then the current class loader does not load a runtime type based on the archived runtime type (Operation 736). Loading from the archive fails for the current class loader.

If there is a match between the URLs, then the current class loader loads a runtime type based on the archived runtime type from the archive (Operation 738). The current class loader passes the archived runtime type, corresponding to the particular type and the current class loader, as a runtime type to the virtual machine. The runtime type is successfully loaded from the archive.

Returning to Operation 730, if (a) the archived runtime type corresponding to the particular type and the current class loader is declared in a package and (b) the declared package is not defined to any runtime module that is defined to the current class loader, then the current class loader determines whether the declared package is defined to a runtime module that is defined to any class loader in a class loader hierarchy to which the current class loader delegates (Operation 740). The current class loader determines whether there exists a runtime module defining the declared package. The current class loader determines whether that runtime module is defined to a parent class loader of the current class loader, or defined to a parent class loader of the parent class loader of the current class loader, or any class loader in the class loader hierarchy. Determining whether the declared package is defined to a runtime module that is defined to a particular class loader is described above with reference to Operation 730.

If the declared package is defined to a runtime module that is defined to a class loader in a class loader hierarchy to which the current class loader delegates, then the current class loader does not load a runtime type based on the archived runtime type (Operation 742). Loading from the archive fails for the current class loader. If the declared package is not defined to any runtime module that is defined to a class loader in a class loader hierarchy to which the current class loader delegates, then the process continues.

One or more embodiments include determining whether the URL associated with the archived runtime type is included in a namespace of the current class loader (Operation 744). This operation (Operation 744) is also performed if the archived runtime type corresponding to the particular type and the current class loader is not declared in any package, as determined at Operation 728.

The namespace associated with the current class loader is identified. The URL associated with the archived runtime type is compared to each entry in the namespace to determine whether there is match. A match between the URL associated with the archived runtime type and an entry in the namespace associated with the current class loader indicates that the archived runtime type was loaded into the archive from the namespace associated with the current class loader.

If the URL associated with the archived runtime type is not included in the namespace of the current class loader, then the current class loader does not load a runtime type based on the archived runtime type (Operation 742). Loading from the archive fails for the current class loader.

If the URL associated with the archived runtime type is included in the namespace of the current class loader, then the current class loader loads the runtime type based on the archived runtime type from the archive (Operation 746). The current class loader passes the archived runtime type, corresponding to the particular type and the current loader, as a runtime type to the virtual machine. The runtime type is successfully loaded from the archive.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
    identifying, by a class loader implemented in a first runtime environment, an archived runtime type loaded into an archive from a module source;
    identifying a particular package associated with the archived runtime type;
    determining whether the particular package is defined to any runtime module, of a module system, that is defined to (i) the class loader or (ii) any class loader in a class loader hierarchy to which the class loader delegates, in the first runtime environment;
    responsive at least to determining that the particular package is not defined to any runtime module that is defined to (i) the class loader or (ii) any class loader in the class loader hierarchy to which the class loader delegates, in the first runtime environment: refraining from loading any runtime type based on the archived runtime type from the archive;
    identifying, by the class loader implemented in a second runtime environment, the archived runtime type loaded into the archive from the module source;
    determining whether the particular package is defined to any runtime module, of the module system, that is defined to (i) the class loader or (ii) any class loader in the class loader hierarchy to which the class loader delegates, in the second runtime environment;
    responsive at least to determining that the particular package is defined to a runtime module that is defined to (i) the class loader or (ii) any class loader in the class loader hierarchy to which the class loader delegates, in the second runtime environment: returning directly or indirectly, by the class loader, a runtime type loaded based on the archived runtime type from the archive; and
    wherein runtime type visibility is enforced by the module system based at least in part on readability of one or more runtime modules as defined in the module system.

2. The medium of claim 1, wherein the module system enforces runtime type accessibility in the first runtime environment.

3. The medium of claim 1, wherein:
    determining that the particular package is defined to the runtime module that is defined to (i) the class loader or (ii) any class loader in the class loader hierarchy to which the class loader delegates comprises: determining that the runtime module is defined to the class loader; and
    returning directly or indirectly, by the class loader, the runtime type loaded based on the archived runtime type from the archive comprises: loading, by the class loader, the runtime type based on the archived runtime type from the archive.

4. The medium of claim 1, wherein refraining from loading the runtime type based on the archived runtime type from the archive is further responsive to: determining that the archived runtime type was loaded into the archive from the module source.

5. The medium of claim 1, wherein returning directly or indirectly, by the class loader, the runtime type loaded based on the archived runtime type from the archive is further responsive to: determining that the archived runtime type was loaded into the archive from the module source.

6. The medium of claim 1, wherein returning directly or indirectly, by the class loader, the runtime type loaded based on the archived runtime type from the archive comprises: storing the runtime type in a memory space used by the first runtime environment to execute operations recited by the runtime type.

7. The medium of claim 1, wherein returning directly or indirectly, by the class loader, the runtime type loaded based on the archived runtime type from the archive comprises: storing the runtime type in a heap memory.

8. The medium of claim 1, wherein the operations further comprise: identifying the particular package in one or more statements of the archived runtime type.

9. The medium of claim 1, wherein the class loader hierarchy to which the class loader delegates comprises a parent class loader of the class loader.

10. The medium of claim 1, wherein identifying a particular package associated with the archived runtime type comprises:
    identifying that a package membership declared by the archived runtime type identifies the particular package.

11. A non-transitory computer readable medium comprising instructions which, when executed by one or more hardware processors, cause performance of operations comprising:
    identifying, by a class loader implemented in a runtime environment, an archived runtime type loaded into an archive from a namespace;
    determining whether the archived runtime type is associated with any package that is defined to any runtime module, of a module system, that is defined to (i) the class loader or (ii) any class loader in a class loader hierarchy to which the class loader delegates; and
    responsive at least to (a) determining that the archived runtime type is not associated with any package that is defined to any runtime module that is defined to (i) the class loader or (ii) any class loader in the class loader hierarchy to which the class loader delegates, and (b) determining that the archived runtime type was loaded into the archive from the namespace associated with a parent class loader of the class loader:
        loading, by the parent class loader, a runtime type based on the archived runtime type from the archive;
        passing the runtime type from the parent class loader to the class loader;

returning, by the class loader, the runtime type loaded based on the archived runtime type from the archive; and wherein runtime type visibility is enforced by the module system based at least in part on readability of one or more runtime modules as defined in the module system.

12. The medium of claim 11, wherein the module system enforces runtime type accessibility in the runtime environment.

13. The medium of claim 11, wherein the operations further comprise:

identifying, by the class loader implemented in a second runtime environment, the archived runtime type loaded into the archive from the namespace;

determining whether the archived runtime type is associated with any package that is defined to any runtime module, of the module system, that is defined to (i) the class loader or (ii) any class loader in a class loader hierarchy to which the class loader delegates, in the second runtime environment; and responsive at least to determining that the archived runtime type is associated with a package that is defined to a runtime module that is defined to (i) the class loader or (ii) any class loader in the class loader hierarchy to which the class loader delegates, in the second runtime environment: refraining from loading any runtime type based on the archived runtime type from the archive.

14. The medium of claim 13, wherein refraining from loading the runtime type based on the archived runtime type from the archive is further responsive to determining that the archived runtime type was loaded into the archive from the namespace.

15. A non-transitory computer readable medium comprising instructions which, when executed by one or more hardware processors, cause performance of operations comprising:

identifying, by a class loader implemented in a first runtime environment, an archived runtime type loaded into an archive from a module source;

identifying a particular package associated with the archived runtime type;

determining whether the particular package is defined to any runtime module, of a module system, that is defined to (i) the class loader or (ii) any class loader in a class loader hierarchy to which the class loader delegates, in the first runtime environment;

responsive at least to determining that the particular package is defined to a runtime module that is defined to a parent class loader of the class loader, in the class loader hierarchy to which the class loader delegates, in the first runtime environment:

loading, by the parent class loader, a runtime type based on the archived runtime type from the archive;

passing the runtime type from the parent class loader to the class loader;

returning, by the class loader, the runtime type loaded based on the archived runtime type from the archive;

wherein runtime type visibility is enforced by the module system based at least in part on readability of one or more runtime modules as defined in the module system.

16. The medium of claim 15, wherein the operations further comprise:

identifying, by the class loader implemented in a second runtime environment, the archived runtime type loaded into the archive from the module source;

determining whether the particular package is defined to any runtime module, of the module system, that is defined to (i) the class loader or (ii) any class loader in a class loader hierarchy to which the class loader delegates, in the second runtime environment;

responsive at least to determining that the particular package is not defined to any runtime module that is defined to (i) the class loader or (ii) any class loader in the class loader hierarchy to which the class loader delegates, in the second runtime environment: refraining from loading any runtime type based on the archived runtime type from the archive.

17. The medium of claim 15, wherein the module system enforces runtime type accessibility in the first runtime environment.

18. The medium of claim 15, wherein returning, by the class loader, the runtime type loaded based on the archived runtime type from the archive comprises: storing the runtime type in a memory space used to execute operations recited by the runtime type.

19. The medium of claim 15, wherein returning, by the class loader, the runtime type loaded based on the archived runtime type from the archive comprises: storing the runtime type in a heap memory.

20. The medium of claim 15, wherein the operations further comprise: identifying the particular package in one or more statements of the archived runtime type.

* * * * *